US012551249B2

(12) United States Patent
Rakes et al.

(10) Patent No.: US 12,551,249 B2
(45) Date of Patent: Feb. 17, 2026

(54) SURGICAL TECHNIQUE FOR MINIMIZING MEDIALIZATION OF AN ORTHOPEDIC INTRAMEDULLARY NAIL

(71) Applicants: Smith & Nephew, Inc., Memphis, TN (US); Smith & Nephew Orthopaedics AG, Zug (CH)

(72) Inventors: Jordan Rakes, Cordova, TN (US); Benjamin Ollivere, Nottingham (GB); Paul Tornetta, III, Chestnut Hill, MA (US); William M. Ricci, New York, NY (US)

(73) Assignees: SMITH & NEPHEW, INC., Memphis, TN (US); SMITH & NEPHEW ORTHOPAEDICS AG, Zug (CH)

( * ) Notice: Subject to any disclaimer, the term of this patent is extended or adjusted under 35 U.S.C. 154(b) by 0 days.

(21) Appl. No.: 18/955,034

(22) Filed: Nov. 21, 2024

(65) Prior Publication Data

US 2025/0082375 A1     Mar. 13, 2025

Related U.S. Application Data

(63) Continuation-in-part of application No. PCT/US2024/028103, filed on May 7, 2024.
(Continued)

(51) Int. Cl.
*A61B 17/72*     (2006.01)
*A61B 17/74*     (2006.01)

(52) U.S. Cl.
CPC ............ *A61B 17/725* (2013.01); *A61B 17/74* (2013.01)

(58) Field of Classification Search
CPC ... A61B 17/746; A61B 17/744; A61B 17/742; A61B 17/74; A61B 17/725
See application file for complete search history.

(56) References Cited

U.S. PATENT DOCUMENTS

2007/0225714 A1*   9/2007   Gradl ................... A61B 17/746
                                                                           606/326
2008/0140077 A1   6/2008   Kebaish
(Continued)

FOREIGN PATENT DOCUMENTS

DE     102005005637 A1 *   8/2006   ......... A61B 17/1725
EP     2782511 B1         1/2017
(Continued)

OTHER PUBLICATIONS

International Search Report and Written Opinion for International Application No. PCT/US2024/028103, mailed on Sep. 17, 2024, 17 pages.

*Primary Examiner* — Julianna N Harvey
(74) *Attorney, Agent, or Firm* — KDW Firm PLLC (57) ABSTRACT

An intramedullary ("IM") nail and surgical technique or method. The IM nail includes a body including an opening for receiving a lag screw and a compression screw. The body further including one or more screw openings for receiving a bone screw. The surgical technique enables a surgeon to selectively prevent or allow movement (e.g., medialization) of the IM nail within the patient's intramedullary canal. The position of the IM nail can be selectively secured within the patient's intramedullary canal depending on surgeon preference and/or depending on the fracture pattern being treated. In use, the surgeon can elect to either secure the position of the IM nail within the patient's intramedullary canal thereby preventing movement (e.g., medialization) of the IM nail within the patient's intramedullary canal, or the surgeon can allow the IM nail to move (e.g., medialize) within the patient's intramedullary canal.

14 Claims, 9 Drawing Sheets

Related U.S. Application Data

(60) Provisional application No. 63/466,415, filed on May 15, 2023.

(56) References Cited

U.S. PATENT DOCUMENTS

| | | | | |
|---|---|---|---|---|
| 2012/0143192 A1* | 6/2012 | Watanabe | ............ | A61B 17/744 606/64 |
| 2013/0261622 A1 | 10/2013 | Bonjour | | |

FOREIGN PATENT DOCUMENTS

| | | | | | |
|---|---|---|---|---|---|
| EP | 3139849 | B1 | | 9/2020 | |
| EP | 3928728 | A1 | * | 12/2021 | ........... A61B 17/744 |
| WO | 20230224905 | A1 | | 11/2023 | |

* cited by examiner

```
┌─────────────────────────────────────────────────────────────────┐
│ INSERTING AN INTRAMEDULLARY ("IM") NAIL WITHIN AN INTRAMEDULLARY│─410
│         CANAL OF A PATIENT'S BONE (E.G., FEMUR)                 │
└─────────────────────────────────────────────────────────────────┘
                                  │
                                  ▼
┌─────────────────────────────────────────────────────────────────┐
│   INSERTING A LAG SCREW AND A COMPRESSION SCREW INTO A FIRST    │─420
│                   OPENING OF THE IM NAIL                        │
└─────────────────────────────────────────────────────────────────┘
                                  │
                                  ▼
┌─────────────────────────────────────────────────────────────────┐
│    INSERTING A BONE SCREW INTO A SECOND OPENING OF THE IM NAIL  │─430
│ TO PREVENT THE IM NAIL FROM MOVING WITHIN THE INTRAMEDULLARY CANAL│
└─────────────────────────────────────────────────────────────────┘
                                  │
                                  ▼
┌─────────────────────────────────────────────────────────────────┐
│  ROTATING THE COMPRESSION SCREW RELATIVE TO THE LAG SCREW TO    │─440
│                     COMPRESS A FRACTURE                         │
└─────────────────────────────────────────────────────────────────┘
```

FIG. 8

SURGICAL TECHNIQUE FOR MINIMIZING MEDIALIZATION OF AN ORTHOPEDIC INTRAMEDULLARY NAIL

CROSS-REFERENCE TO RELATED APPLICATIONS

This application is a continuation-in-part of International Patent Application No. PCT/US24/28103, filed May 7, 2024, entitled "Orthopedic Intramedullary Nail System for Greater Trochanter Fixation," which application is a non-provisional of, and claims the benefit of the filing date of, U.S. provisional patent application No. 63/466,415, filed May 15, 2023, entitled "Orthopedic Intramedullary Nail System for Greater Trochanter Fixation," the entirety of each application is incorporated by reference herein.

FIELD OF THE INVENTION

The present disclosure is directed to an intramedullary ("IM") nail for stabilizing one or more patient's bones, bone portions, bone fragments, etc., and more specifically to a surgical technique or method for minimizing movement (e.g., medialization) of the IM nail.

BACKGROUND

Orthopedic fixation devices (e.g., implants) may be used, for example, to stabilize an injury, to support a bone fracture, to fuse a joint, and/or to correct a deformity. Orthopedic fixation devices may be attached permanently or temporarily, and may be attached to the bone at various locations, including implanted within a canal or other cavity of the bone, implanted beneath soft tissue and attached to an exterior surface of the bone, or disposed externally and attached by fasteners such as screws, pins, and/or wires. Some orthopedic fixation devices allow the position and/or orientation of two or more bone pieces, or two or more bones, to be adjusted relative to one another. Orthopedic fixation devices are generally machined or molded from isotropic materials, such as metals including, for example, titanium, titanium alloys, stainless steel, cobalt-chromium alloys, and tantalum.

An intramedullary ("IM") nail is one type of orthopedic fixation device. The primary function of the IM nail is to stabilize the fracture fragments, and thereby enable load transfer across the fracture site while maintaining anatomical alignment of the bone. Currently, there are a large number of different commercially available IM nails in the marketplace.

Figure 1A:
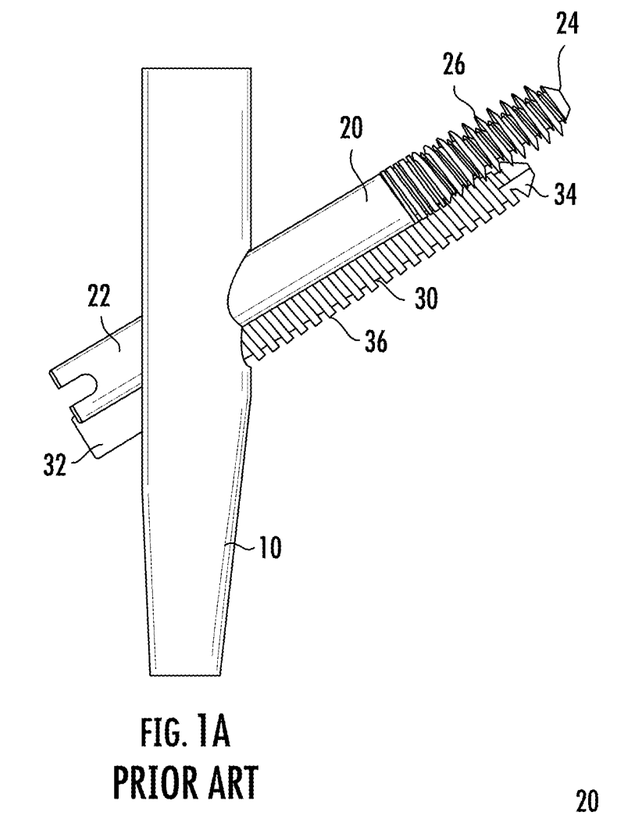
FIG. 1A is a view of a conventional example of an intramedullary ("IM") nail system to treat hip fractures, the IM nail system including an IM nail utilizing nested lag and compression screws.
Figure 1B:
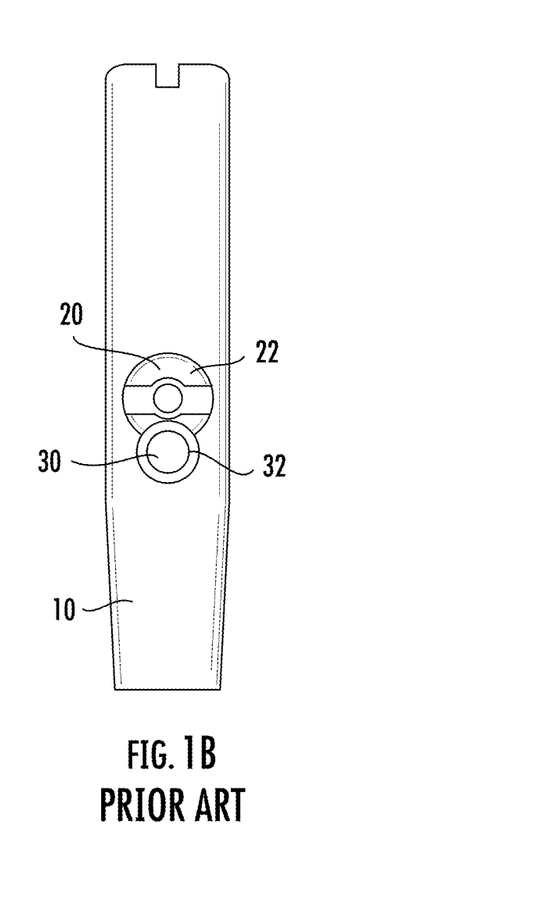
FIG. 1B is a side view of the IM nail system shown in FIG. 1A.
Figure 1C:
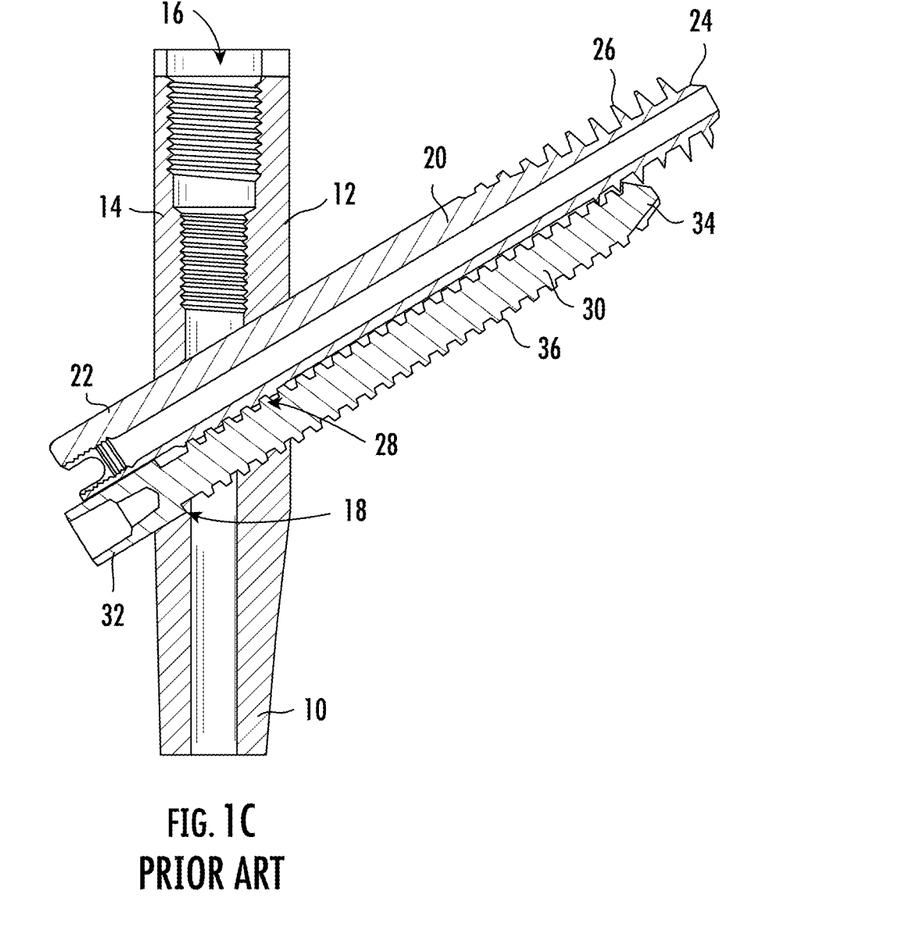
FIG. 1C is a cross-sectional view of the IM nail system shown in FIG. 1A.

One known type of an IM nail is the TRIGEN INTERTAN IM nail manufactured and sold by Smith Nephew, Inc. In use, the TRIGEN INTERTAN IM nail can be used to treat intertrochanteric hip fractures. With reference to FIGS. 1A-1C, an example of a TRIGEN INTERTAN IM nail system includes an IM nail 10 arranged and configured to be inserted into the intramedullary canal of a patient's femur. In addition, the TRIGEN INTERTAN IM nail system includes nested lag and compression screws 20, 30, which are arranged and configured to pass through an opening or hole (terms used interchangeably herein without the intent to limit or distinguish) formed in a body of the IM nail 10 and into a patient's fractured femoral neck and/or head to draw the femoral neck and/or head towards the shaft of the femur. Generally speaking, the diameter of the portion of the opening formed in the body of the IM nail 10 for receiving the lag screw 20 is greater than the diameter of the portion of the opening formed in the body of the IM nail 10 for receiving the compression screw 30.

Generally speaking, as illustrated, the lag screw 20 includes a lateral head portion 22, a medial end 24, and an externally threaded segment 26 disposed adjacent to the medial end 24. In use, the lag screw 20 passes through the opening formed in the body of the IM nail 10. The compression screw 30 includes an enlarged lateral head 32, a medial end 34, and an externally threaded segment 36 extending from the lateral head 32 to the medial end 34. As illustrated, the compression screw 30 is non-cannulated and externally threaded along its entire length. In use, the threaded segment 36 of the compression screw 30 passes through the opening formed in the body of the IM nail 10 and engages a rack 28 (FIG. 1C) disposed on a side of the lag screw 20. That is, the compression screw 30 is a fully threaded screw which engages a rack 28 on the lag screw 20 to act as a worm gear. Thus arranged, the compression screw 30 is nested (e.g., meshes) with the lag screw 20.

In use, with reference to FIG. 1C, the IM nail 10 includes a cannulated bore 16 defining a medial wall 12 and a lateral wall 14. The lateral wall 14 of the IM nail 10 including a step 18 formed therein. The lateral head 32 of the compression screw 30 contacts the step 18 formed in the lateral wall 14 of the IM nail 10, which prevents further advancement of the compression screw 30. Once contact with the step 18 occurs, continued rotation of the compression screw 30 rotates the lag screw 20 causing the lag screw 20 to move laterally toward the IM nail 10 thereby closing or compressing the patient's fracture (e.g., contact of the compression screw 30 with the step 18 causes the compression screw 30 to stop advancing, thus continued rotation of the compression screw 30 causes the lag screw 20 to pull back towards the IM nail 10 and thus close or compress the patient's fracture). That is, in use and as will be readily appreciated by one of ordinary skill in the art, the lag screw 20 is initially inserted through the IM nail 10 and into engagement with a patient's bone fragment. Thereafter, the compression screw 30 is inserted through the IM nail 10 and into the bone fragment. Rotation of the compression screw 30 initially causes the compression screw 30 to advance into the patient's bone fragment. However, once the compression screw 30 contacts the step 18 formed in the IM nail 10, continued rotation of the compression screw 30 causes the lag screw 20 to move laterally to apply a compressive force across the patient's fracture. Thus, in use, rotating the compression screw 30 applies an axial force to the lag screw 20, which was previously anchored into a fragment of the patient's bone. Accordingly, rotating the compression screw 30 draws the lag screw 20, and the bone fragment affixed to the lag screw 20, in a direction along the length of the compression screw 30 and into position for proper healing.

While a particular example of an IM nail including nested lag and compression screws is illustrated, the present disclosure is not so limited. For example, as illustrated in FIGS. 1A and 1C, the compression screw 30 may be completely threaded. However, alternatively, in some examples, the compression screw may be arranged as a partially threaded compression screw that nests or meshes with the lag screw. That is, for example, the compression screw may include a first or lateral segment including a plurality of threads for engaging corresponding threads formed on the lag screw and a second or medial segment including a non-threaded bone contacting surface for contacting or piercing the patient's femoral head. In addition, and/or alternatively, in some examples, the compression screw may include a cannulated bore extending therethrough.

In addition, and/or alternatively, the nested lag and compression screws can be configured with, for example, a lag screw assembly arranged and configured to enable the lag screw to slide, move, telescope, etc. towards the IM nail in order to maintain contact and/or compression across the patient's fracture (e.g., maintain compression and/or contact of the fractured femoral neck to the femoral shaft) while preventing, or at least minimizing, lateral prominence of the lag screw in the soft tissue, which may lead to tissue irritation and potentially reoperation.

Additional information can be found in U.S. patent application Ser. No. 18/704,209, filed on Apr. 24, 2024, entitled "Orthopedic Fixation Device with Lag Screw and Compression Screw," the entirety of which is incorporated by reference herein.

One potential disadvantage of utilizing an IM nail 10 including nested lag and compression screws 20, 30 is that, during use, rotation of the compression screw 30 rotates the lag screw 20 causing the lag screw 20 to move laterally toward the IM nail 10. This movement achieves compression across the bone fracture. In addition, however, rotation of the compression screw 30 causes the IM nail 10 to move medially within the patient's intramedullary canal toward and/or into contact with the medial wall of the patient's intramedullary canal (e.g., the unconstrained IM nail 10 moves medially within the patient's intramedullary canal due to the opposing forces caused by rotation of the compression screw 30 and the lag screw 20). Depending on the type of fracture being treated, medial movement of the IM nail 10 may be an advantage or a disadvantage. For example, during treatment of stable fractures, movement of the IM nail 10 within the patient's intramedullary canal provides numerous benefits, for example, movement of the IM nail 10 against the intramedullary wall decreases the resulting moment arm of the lag and compression screws, which results in longer fatigue life. However, in certain instances, movement of the IM nail medially within the patient's intramedullary canal may have detrimental effects. For example, in unstable or comminuted fractures, movement of the IM nail within the intramedullary canal may cause bone fragments to be pushed out of compression (e.g., reduction). As such, medial movement of the IM nail within the patient's intramedullary canal can lead to malreduction and/or post-operative collapse during treatment of certain unstable fractures.

Thus, it would be beneficial to provide surgeons with the ability to selectively secure the position of the IM nail 10 within the patient's intramedullary canal before fracture compression (e.g., before rotating the compression screw 30 relative to the lag screw 20). Thereby providing surgeons with increased flexibility to treat patient's fractures.

Thus, there remains a need to provide improved IM nails and corresponding surgical techniques. The present invention satisfies this need and provides other benefits and advantages in a novel and unobvious manner.

BRIEF SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An orthopedic surgical technique or method for selectively preventing or allowing movement (e.g., medialization) of an IM nail within a patient's intramedullary canal is disclosed. In use, the position of the IM nail can be selectively secured within the patient's intramedullary canal depending on surgeon preference and/or depending on the fracture pattern being treated. That is, based on surgeon preference and/or fracture pattern, the surgeon can either secure the position of the IM nail within the patient's intramedullary canal thereby preventing movement (e.g., medialization) of the IM nail within the patient's intramedullary canal, or the surgeon can allow the IM nail to move (e.g., medialize) within the patient's intramedullary canal.

In some examples, a surgical method for implanting an intramedullary ("IM") nail within an intramedullary canal of a patient's bone is disclosed. The method including inserting the IM nail within the intramedullary canal, the IM nail including a body and first and second openings; inserting a lag screw and a compression screw into the first opening; inserting a bone screw into the second opening; and rotating the compression screw relative to the lag screw to compress a fracture; wherein inserting the bone screw into the second opening prevents movement of the body during fracture compression.

In any preceding or subsequent example, rotating the compression screw relative to the lag screw causes the lag screw to move laterally relative to the body.

In any preceding or subsequent example, the lag screw and the compression screw are inserted into the first opening prior to the bone screw being inserted into the second opening; and the bone screw is inserted into the second opening prior to fracture compression.

In any preceding or subsequent example, the bone screw is inserted into the second opening prior to the lag screw and the compression screw being inserted into the first opening.

In any preceding or subsequent example, the second opening is located superiorly of the first opening so that the second opening is located adjacent a proximal end of the body.

In any preceding or subsequent example, the second opening is located inferiorly of the first opening so that the second opening is located closer to a distal end of the body as compared to the first opening.

In any preceding or subsequent example, the second opening is located adjacent to the first opening.

In any preceding or subsequent example, the second opening is located adjacent to a distal end of the body.

In any preceding or subsequent example, the body of the IM nail further includes one or more additional openings arranged and configured to receive a bone screw.

In any preceding or subsequent example, the second opening is located superiorly of the first opening so that the second opening is located adjacent a proximal end of the body; and the one or more additional openings are located inferiorly of the first opening so that the one or more additional openings are located closer to a distal end of the body as compared to the first opening.

In any preceding or subsequent example, the IM nail further includes a washer, the method further includes positioning the washer adjacent a boney surface; and inserting the bone screw through an opening formed in the washer and into the second opening formed in the body.

In any preceding or subsequent example, the second opening is located superiorly of the first opening so that the second opening is located adjacent a proximal end of the body; and the washer is positioned against the patient's greater trochanter.

In some examples, a surgical method for implanting an intramedullary ("IM") nail within an intramedullary canal of a patient's bone is disclosed. The method includes determining a type of fracture in the patient's bone to be repaired; inserting the IM nail within the intramedullary canal, the IM nail including a body and first and second openings; inserting a lag screw and a compression screw into the first opening; depending on the type of fracture to be repaired, selectively inserting a bone screw into the second opening; and rotating the compression screw relative to the lag screw to compress the fracture; wherein inserting the bone screw into the second opening prevents movement of the body during fracture compression.

In any preceding or subsequent example, the type of fractures include one of an undisplaced fracture, a simple intertroch fracture, a complex fracture, a fracture with subtroch components, or a combination thereof.

In any preceding or subsequent example, the type of fracture is an undisplaced fracture or a simple intertroch fracture, a surgeon rotates the compression screw relative to the lag screw without the bone screw being inserted into the second opening so that the body can move within the intramedullary canal.

In any preceding or subsequent example, the type of fracture is a complex fracture or a fracture with subtroch components, a surgeon inserts the bone screw into the second opening so that the body cannot move within the intramedullary canal.

In any preceding or subsequent example, the lag screw and the compression screw are inserted into the first opening prior to the bone screw being inserted into the second opening; and the bone screw is inserted into the second opening prior to fracture compression.

In any preceding or subsequent example, the second opening is located superiorly of the first opening so that the second opening is located adjacent a proximal end of the body.

In some examples, an intramedullary ("IM") nail is disclosed. The IM nail including a body including a proximal end, a distal end, and first and second openings formed therethrough, the second opening being positioned superiorly of the first opening so that the second opening is positioned adjacent the proximal end; a lag screw positioned within the first opening formed in the body, the lag screw including a plurality of threads; a compression screw positioned within the first opening formed in the body, the compression screw including a plurality of threads arranged and configured to interact with the plurality of threads formed on the lag screw so that, in use, rotation of the compression screw causes the lag screw to move; and a bone screw positioned within the second opening; wherein inserting the bone screw into the second opening prior to rotating the compression screw prevents the body from moving within an intramedullary canal of a patient.

Exemplary embodiments of the present disclosure provide numerous advantages. For example, a surgical technique or method is disclosed wherein the surgeon can selectively elect when to constrain the IM nail within the patient's intramedullary canal and when to leave the IM nail unconstrained. As such, the surgeon is provided with increased flexibility to elect when to allow the position of the IM nail to move (e.g., medialize) and when to prevent movement (e.g., medialization) of the IM nail within the patient's intramedullary canal. Thus, the surgeon can selectively secure the position of the IM nail within the patient's intramedullary canal depending on surgeon preference and/or on the fracture pattern being treated.

Further features and advantages of at least some of the exemplary embodiments of the present invention, as well as the structure and operation of various exemplary embodiments of the present invention, are described in detail below with reference to the accompanying drawings.

BRIEF DESCRIPTION OF THE DRAWINGS

By way of example, specific examples of the disclosed device will now be described, with reference to the accompanying drawings, in which.

It should be understood that the drawings are not necessarily to scale and that the disclosed examples are sometimes illustrated diagrammatically and in partial views. In certain instances, details which are not necessary for an understanding of the disclosed methods and devices or which render other details difficult to perceive may have been omitted. It should be further understood that this disclosure is not limited to the particular examples illustrated herein. In the drawings, like numbers refer to like elements throughout unless otherwise noted.

DETAILED DESCRIPTION

Various features of an intramedullary ("IM") nail, system, and/or technique/method arranged and configured to treat hip fractures, will now be described more fully hereinafter with reference to the accompanying drawings, in which one or more features of the IM nail, system, and/or method/technique will be shown and described. It should be appreciated that the various features may be used independently of, or in combination, with each other. It will be appreciated that an IM nail, system, and/or method/technique as disclosed herein may be embodied in many different forms and should not be construed as being limited to the examples set forth herein. Rather, these examples are provided so that this disclosure will convey certain features of the IM nail, system, and/or method/technique to those skilled in the art.

In accordance with one or more features of the present disclosure, an orthopedic surgical technique or method for selectively preventing or allowing movement (e.g., medialization) of an IM nail within a patient's intramedullary canal is disclosed. In use, the position of the IM nail can be selectively secured prior to fracture compression by the surgeon within the patient's intramedullary canal depending on surgeon preference and/or fracture pattern being treated. That is, based on surgeon preference and/or fracture pattern, the surgeon can either secure the position of the IM nail within the patient's intramedullary canal thereby preventing movement (e.g., medialization) of the IM nail within the patient's intramedullary canal, or the surgeon can allow the IM nail to move (e.g., medialize) within the patient's intramedullary canal.

As used herein, nail medialization means or includes movement of an IM nail such as, for example, a cephalomedullary nail, within an intramedullary canal of a patient's femoral bone. In use, movement of the IM nail may occur during fracture compression (e.g., rotation of the compression screw received within the IM nail relative to the lag screw to compress or close the fracture). That is, in use, rotation of the integrated screw (e.g., nested lag and compression screws) may cause the IM nail to move from its initial insertion position to a medial position. That is, in use, the diameter of the body of an IM nail may be smaller than the diameter of the patient's intramedullary canal. In addition, initially, the IM nail may not be well secured within the patient's intramedullary canal. Thus, during application of a compressive force applied to the IM nail from the lateral side (as occurs in the intra-operative compression applied by the lag and compression screws), the body of the IM nail is pushed from its initial insertion position to a subsequent position such as, for example, into contact against the medial wall of the patient's intramedullary canal. This nail medialization has advantages and disadvantages depending on the fracture pattern being treated. For example, in an undisplaced or otherwise simple intertroch fracture, medializing the IM nail can increase the strength of the implant construct by reducing the moment arm on the lag and compression screws. However, in complex fractures or fractures with subtroch components, uncontrolled medialization of the IM nail can result in malreduction of the fracture. Thus, in accordance with one or more features of the present disclosure, a surgical technique or method is provided wherein the surgeon can elect whether to secure the position of the IM nail within the patient's intramedullary canal prior to fracture compression, or whether to leave the IM nail unconstrained so that medialization of the IM nail is permitted. For example, the surgeon can elect to secure the position of the IM nail within the patient's intramedullary canal before fracture compression to prevent medialization of the IM nail during lateral compression. Alternatively, the surgeon can elect to leave the IM nail unconstrained so that the IM nail can move (e.g., medialize) within the patient's intramedullary canal during fracture compression. In some example, the IM nail can be fixed proximally or distally (e.g., superiorly or inferiorly) relative to the lag and compression screw prior to compression.

Figure 2A:
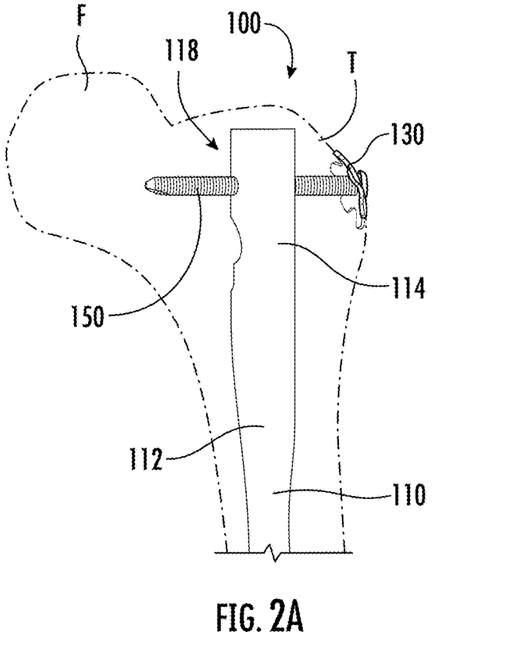
FIG. 2A is an anterior view of an example of an IM nail system including an IM nail, a washer, and a bone screw, the IM nail system shown implanted within a patient's bone.
Figure 2B:
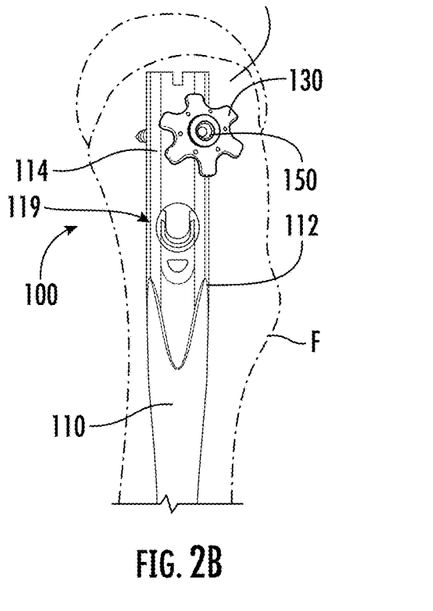
FIG. 2B is a lateral view of the IM nail system shown in FIG. 2A.
Figure 2C:
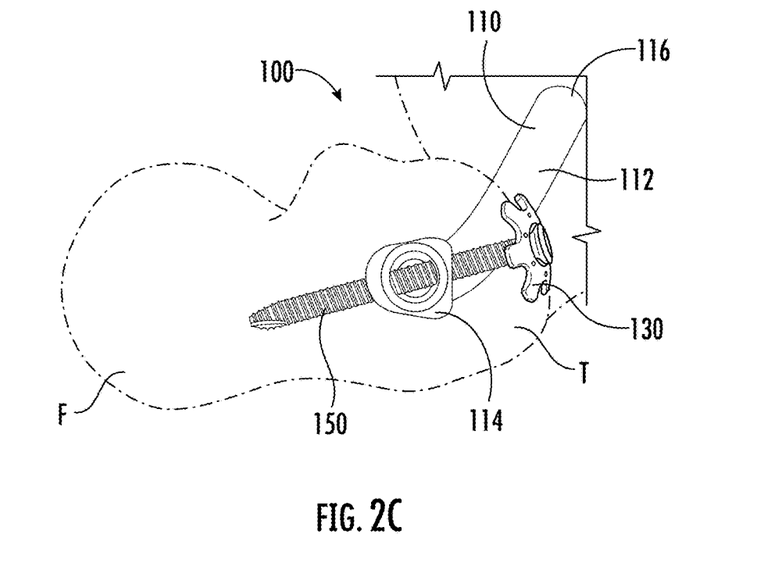
FIG. 2C is a top or superior view of the IM nail system shown in FIG. 2A.

With reference to FIGS. 2A-2C, an example of an IM nail system 100 in accordance with one or more features of the present disclosure is illustrated. As illustrated, the IM nail system 100 includes an IM nail 110, a washer or bone plate 130, and at least one bone screw 150 (terms washer and bone plate used interchangeably herein without the intent to limit or distinguish). In addition, as illustrated, the IM nail 110 may include a screw opening 118 formed in the IM nail 110. The screw opening 118 being positioned superiorly of the opening 119 for receiving the nested lag and compression screws.

That is, in use, a potential disadvantage of IM nails is that during fracture compression there may be fractured fragments, which cannot be captured using the IM nail and screw offerings. This may be the result of limited space within the IM nail for screw holes or bone fragments, which may be too small or too soft to be captured by the available screws. For example, during intertrochanteric fractures treated with a cephalomedullary nail, greater trochanter fragments may not be adequately captured using the IM nail alone. Left untreated, greater trochanter fragments can result in bursitis or abductor mechanism deficiency.

In accordance with one or more features of the present disclosure, as will be readily appreciated by one of ordinary skill in the art, the IM nail 110 may be implanted into the intramedullary canal of a patient's femur. As such, the IM nail 110 may be referred to as a femoral nail. Generally speaking, the IM nail 110 includes a body 112 such as, for example, a cannulated body. The body 112 includes a proximal end portion 114 and a distal end portion 116. The proximal end portion 114 and the distal end portion 116 including a plurality of screw openings, holes, slots, etc. 118 (terms used interchangeably herein without the intent to limit) arranged and configured to receive a bone fastener, screw, etc. (terms used interchangeably herein without the intent to limit or distinguish). In some examples, the screw openings can be threaded. Alternatively, the screw openings can be non-threaded, or have any other configuration now known or hereafter developed. For reasons that will become apparent below, by providing a threaded screw opening, the IM nail 110 facilitates compression against the fractured fragment of the patient's greater trochanter T without relying on screw fixation with the patient's bone (e.g., femur F).

In use, the IM nail 110 may be any suitable femoral nail now known or hereafter developed including nested lag and compression screws. In addition, while the present disclosure will describe and illustrate an IM nail system, and corresponding method, for fracture fixation of a femoral head, one or more features of the present disclosure may have applicability to other parts of the patient's body. As such, the present disclosure should not be limited to any particular IM nail or part of the patient's body unless specifically claimed.

Figure 3A:
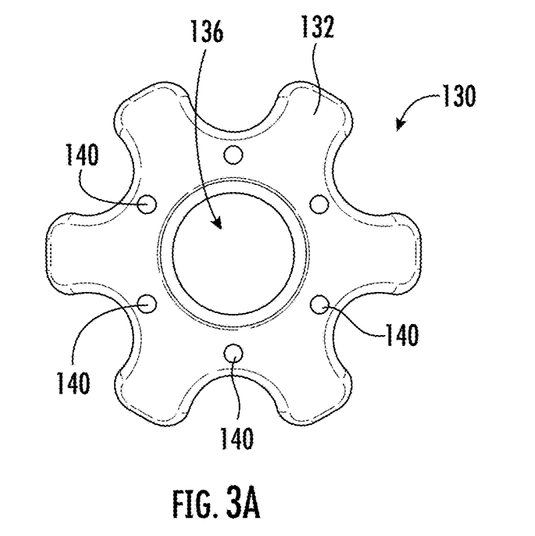
FIG. 3A is a top view of an example of a washer, the washer forming part of the IM nail system shown in FIG. 2A.
Figure 3B:
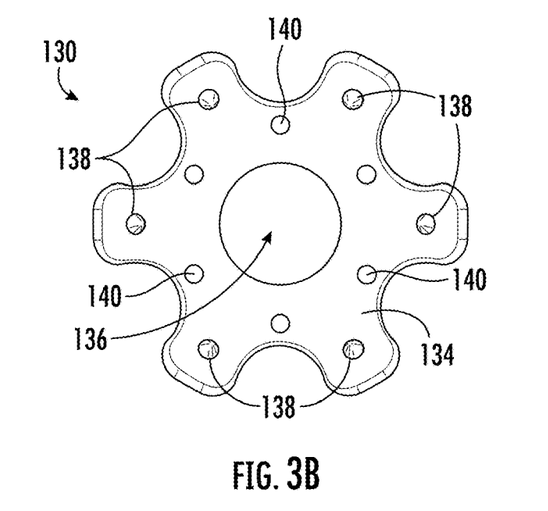
FIG. 3B is a bottom view of the washer shown in FIG. 3A.
Figure 3C:
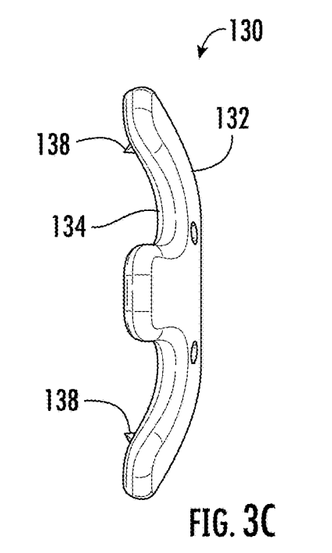
FIG. 3C is a side view of the washer shown in FIG. 3A.
Figure 5A:
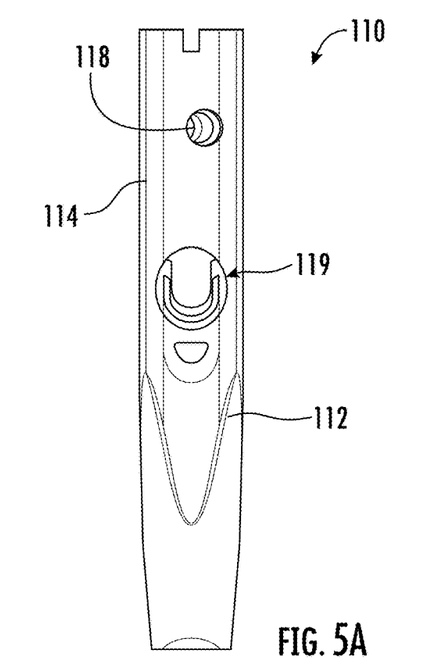
FIG. 5A is a detailed view of a proximal end portion of an IM nail, the IM nail forming part of the IM nail system shown in FIG. 2A.
Figure 5B:
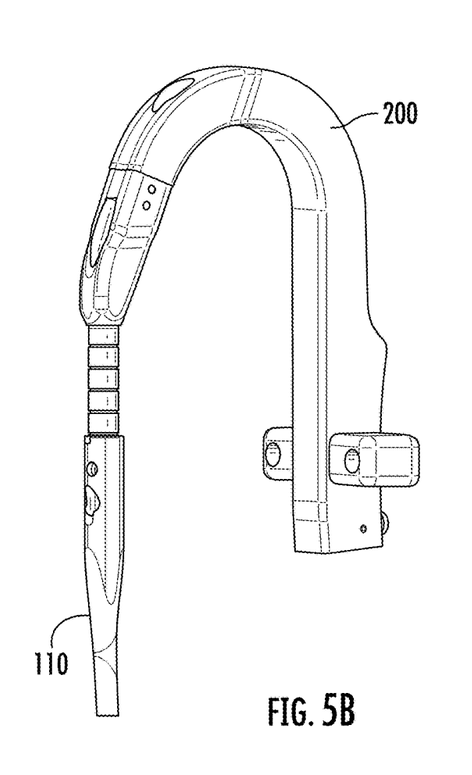
FIG. 5B is a perspective view of a targeting jig coupled to the IM nail shown in FIG. 5A.
Figure 5C:
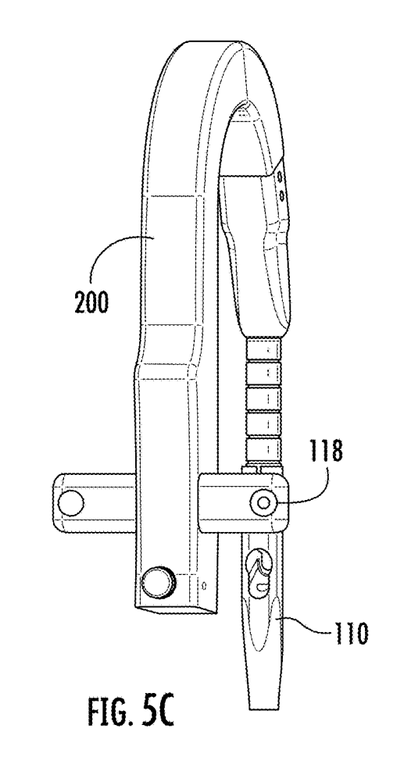
FIG. 5C is an alternate perspective view of the targeting jig coupled to the IM nail shown in FIG. 5B.

With reference to FIGS. 2A-2C, and with additional reference to FIGS. 3A-3C, the washer 130 includes a first or outer surface 132, a second or bone contacting surface 134, and a hole 136 extending between the first and second surfaces 132, 134. In use, with the IM nail 110 implanted within the intramedullary canal of the patient's femur F and with the washer 130 positioned against the patient's greater trochanter T, the hole 136 formed in the washer 130 may be aligned with one of the plurality screw openings 118 formed in the proximal end portion 114 of the body 112 of the IM nail 110. For example, as illustrated in FIGS. 5A-5C, a targeting jig 200 may be coupled to the proximal end portion 114 of the body 112 of the IM nail 110. Thereafter, utilizing the targeting jig 200, as will be readily appreciated by one of ordinary skill in the art, the hole 136 formed in the washer 130 can be aligned with one of the plurality of screw openings 118 formed in the body 112 of the IM nail 110 so that a bone screw 150 can be inserted through the hole 136 formed in the washer 130 and into the screw opening 118 formed in the IM nail 110. Thus arranged, in use, a fracture of the greater trochanter T can be fixed by compressing the fractured fragment of the patient's greater trochanter T between the washer 130 and the IM nail 110 via the bone screw 150 (e.g., the greater trochanter fractured fragment can be fixed via implanting a targeted bone screw through the washer and IM nail to apply compression across the fragment to encourage healing).

Figure 4A:
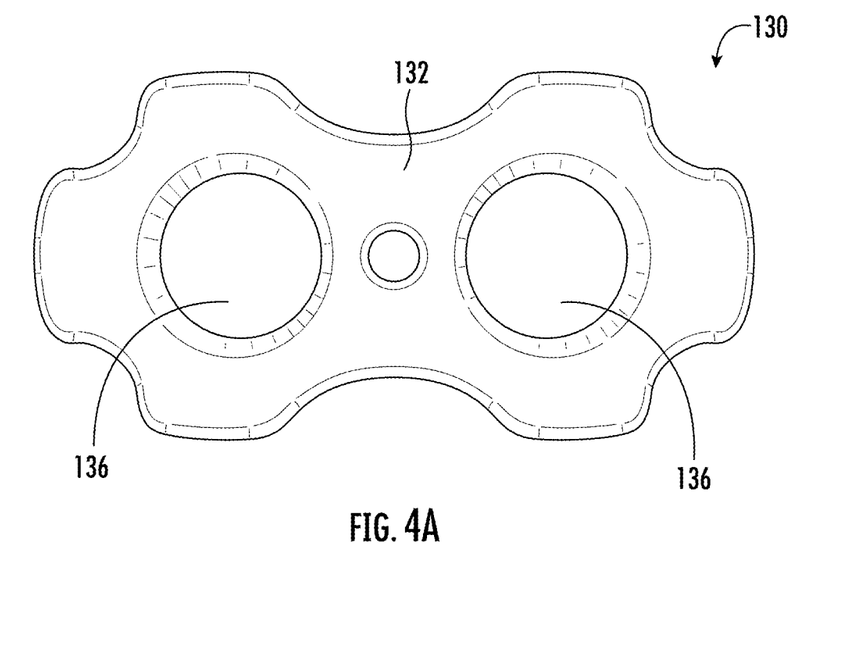
FIG. 4A is a top view of an alternate example of a washer, the washer forming part of the IM nail system shown in FIG. 2A.
Figure 4B:
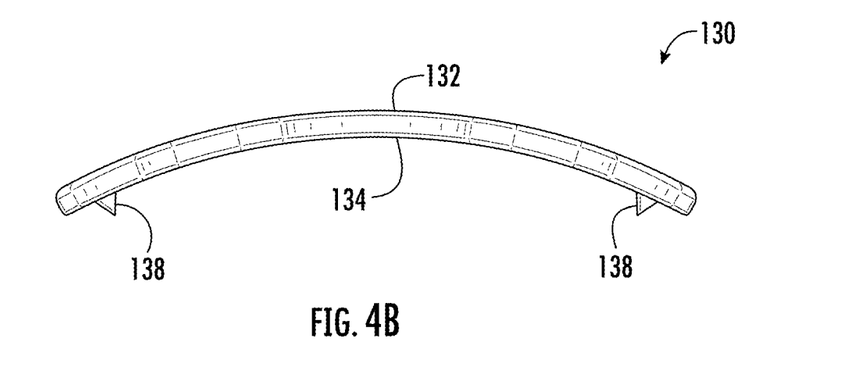
FIG. 4B is a side view of the washer shown in FIG. 4A.

In some examples, as illustrated in FIGS. 3A-3C, the washer 130 may generally have the form of a circular plate with a plurality of arms extending therefrom. For example, as illustrated, the washer 130 may include a central region including a plurality of arms extending therefrom, the central region including the at least one hole 136. In use, the washer 130 may be arranged and configured to be malleable and/or flexible. For example, the plurality of arms may be flexible relevant to the central region so that the washer 130 can conform to the shape of the patient's bone (e.g., greater trochanter). However, this is but one configuration and the washer 130 may have any suitable shape and/or configuration now known or hereafter developed. For example, while the washer 130 has been illustrated in FIGS. 3A-3C with a single central opening, other configurations are envisioned. For example, with reference to FIGS. 4A and 4B, the washer 130 may include a plurality of screw holes 136 such as, for example, first and second screw openings. By providing multiple screw openings, surgeons have increased flexibility in placing the washer 130 onto the patient's greater trochanter T to accommodate different fracture patterns and patient anatomy.

In some examples, as shown, the second or bone facing surface 134 of the washer 130 may include a plurality of spikes 138 extending therefrom to facilitate increased contact (e.g., grip) with the patient's greater trochanter T.

In addition, and/or alternatively, in some examples, the washer 130 may include a plurality of suture openings 140 for reattaching soft tissue.

As previously mentioned, with reference to FIGS. 5A-5C, utilization of a targeting jig 200 and IM nail system 100 is shown with the jig 200 providing targeted trajectory through the IM nail 110. In use, the targeting jig 200 may be used to facilitate screw hole trajectory for the placement of the washer 130.

Thus arranged, in use, a surgeon can implant the IM nail 110 into the intramedullary canal of the patient's femur F. Thereafter, as appropriate, utilizing a targeting jig 200 or other now known or hereafter developed targeting mechanism, the surgeon can position a washer 130 onto the patient's greater trochanter T and insert a bone screw 150 through the washer 130 and into the IM nail 110 to secure and/or compress the fractured fragment of the patient's greater trochanter T. For example, in use, the IM nail 110 may include a threaded opening 118 formed therein for receiving the bone screw 150. Thus arranged, by inserting the bone screw 150 through the opening 136 formed in the washer 130 and into the threaded opening 118 formed in the IM nail 110, the greater trochanter and/or fracture can be compressed between the washer 130 and the IM nail 110.

Figure 6A:
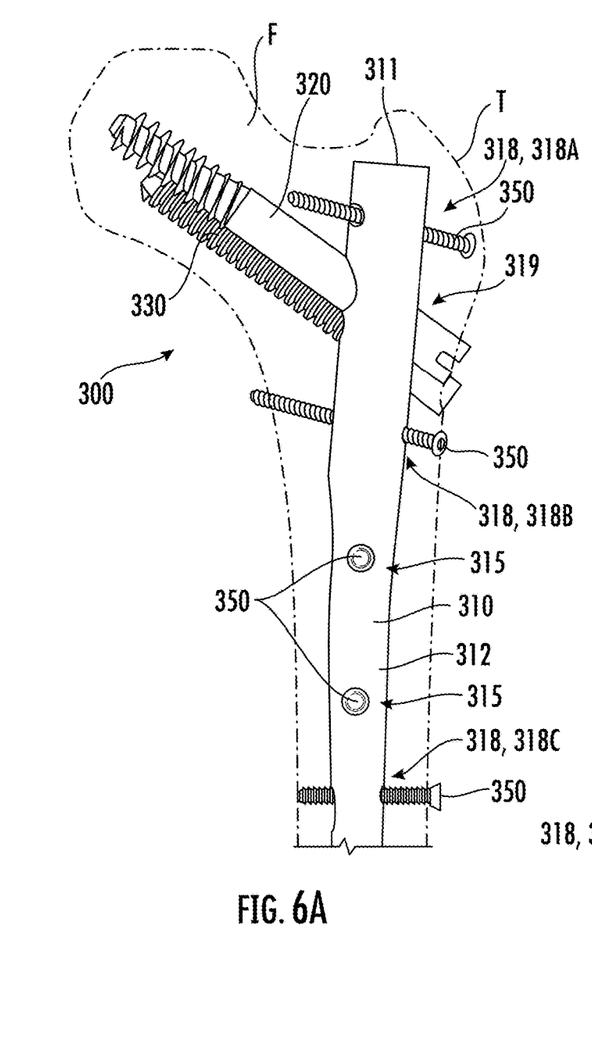
FIG. 6A is an anterior view of an example of an IM nail system to treat hip fractures in accordance with one or more features of the present disclosure, the IM nail system including an IM nail utilizing nested lag and compression screws, the IM nail including one or more optional screw openings arranged to receive an external bone screw.
Figure 6B:
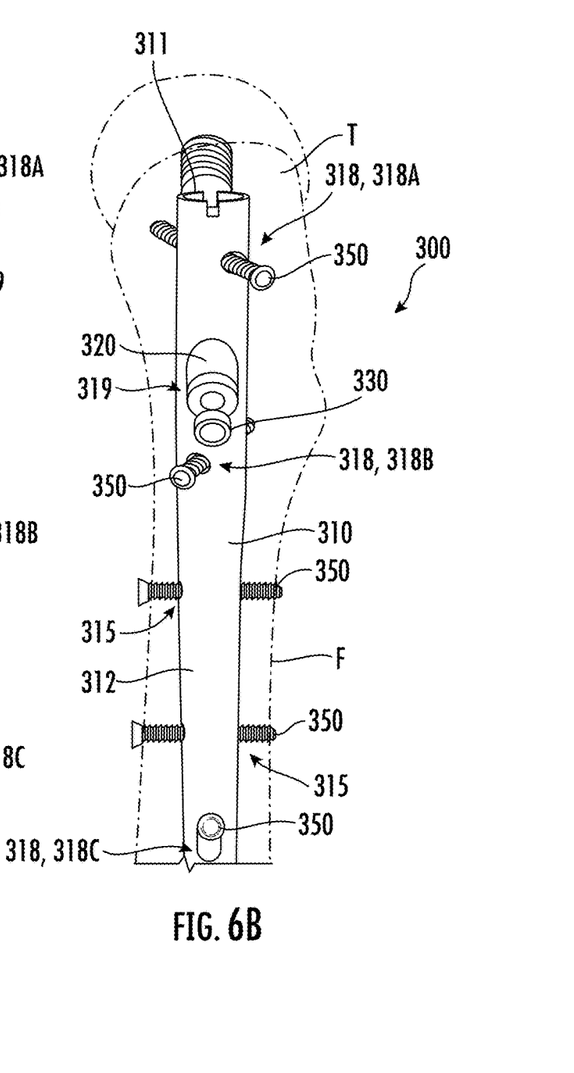
FIG. 6B is a lateral view of the IM nail system shown in FIG. 6A.

With reference to FIGS. 6A and 6B, a surgical method or technique in accordance with one or more features will be described. That is, as previously mentioned, during use, rotation of the compression screw such as, for example, compression screw 30, causes the lag screw such as, for example, lag screw 20, to move laterally and the IM nail such as, for example, IM nail 10, to move medially. Medial movement of the IM nail may or may not be desirable depending on the type of patient fracture being treated. Thus, in accordance with one or more features of the present disclosure, the IM nail may include one or more features, which enable the surgeon to secure the position of the IM nail within the patient's intramedullary canal before rotation of the compression screw.

That is, in accordance with one or more features of the present disclosure, the IM nail may be secured via, for example, screw fixation, either proximal or distally or both (e.g., superiorly or distally) relative to the lag and compression screws prior to fracture compression (e.g., rotation of the compression screw relative to the lag screw). With reference to FIGS. 6A and 6B, the IM nail system 300 may include an IM nail 310, a lag screw 320, a compression screw 330, and one or more bone screws 350. In some examples, the IM nail 310 includes a body 312, one or more screw openings 318 arranged and configured to receive one of the bone screws 350, and a screw opening 319 arranged and configured to receive the lag and compression screw 320, 330. For example, the body 312 may include a screw opening 318A positioned superiorly of the screw opening 319 for the lag and compression screw 320, 330.

Figure 8:
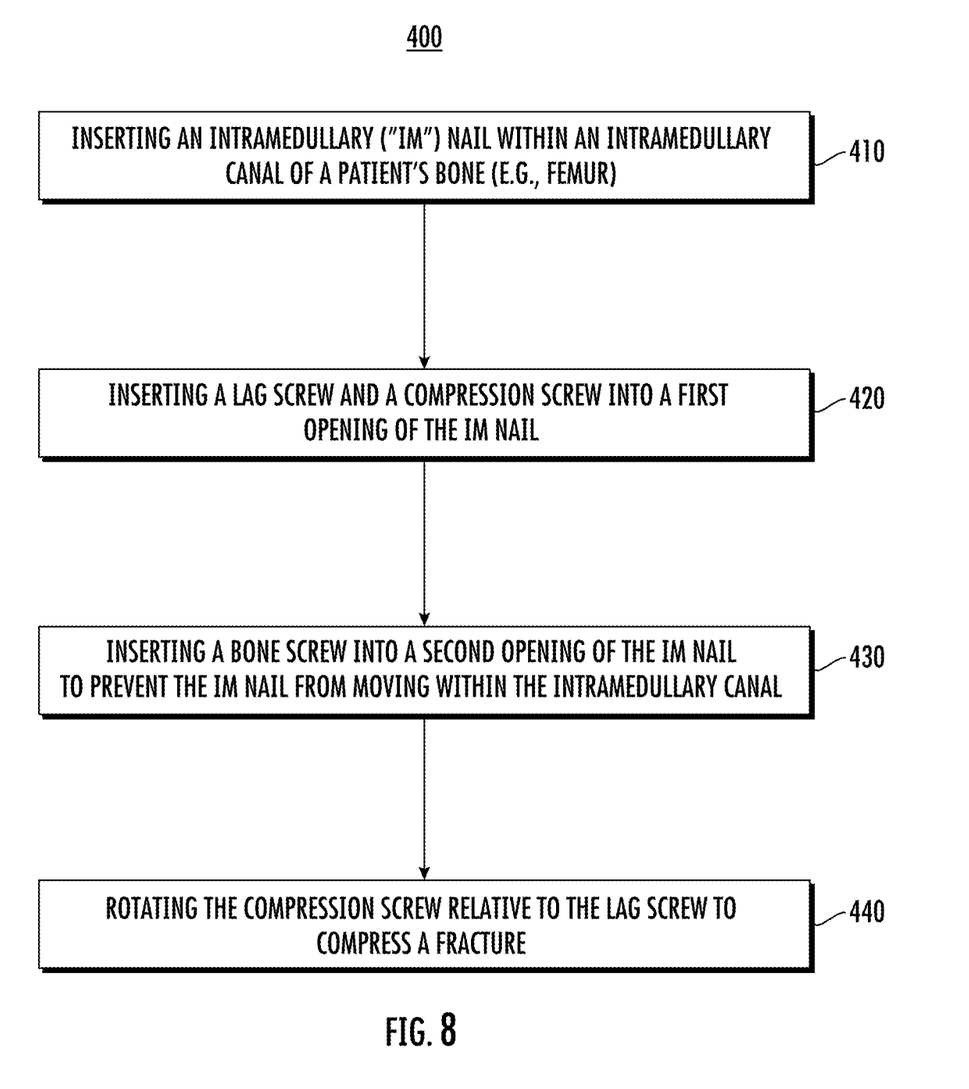
FIG. 8 is a flowchart of an example surgical technique in accordance with one or more features of the present disclosure.

Thus arranged, with additional reference to FIG. 8, in accordance with one or more features of the present disclosure, in an improved surgical technique or method 400, the patient's intramedullary canal can be prepared and the IM nail 310 can be inserted into the intramedullary canal at step 410. The intramedullary canal and IM nail 310 can be prepared and inserted by any suitable technique now known or hereafter developed as will be readily appreciated by one of ordinary skill in the art.

Next, at step 420, the lag and compression screws 320, 330 can be inserted into the patient's femur F, through the screw opening 319 formed in the body 312 of the IM nail 310 and into the femoral head. Thereafter, at step 430, a bone screw (e.g., a trochanter screw) 350 can be inserted into the superiorly positioned screw opening 318A thereby securing the position of the IM nail 310 within the intramedullary canal of the patient's bone. With the bone screw 350 inserted, the position of the IM nail 310 within the patient's intramedullary canal is secured. Thereafter, at step 440, using the lag and compression screws 320, 330, fracture compression can be commenced (e.g., the compression screw 330 can be rotated relative to the lag screw 320 to compress the fracture). However, by securing the position of the IM nail 310 within the patient's intramedullary canal via inserting the bone screw 350 into the superiorly positioned screw opening 318A prior to commencing fracture compression, the IM nail 310 is prevented from moving within the intramedullary canal. However, it should be appreciated that this is but one example and other examples may be used. For example, the bone screw 350 can be inserted into the superiorly positioned screw opening 318A prior to inserting the lag and compression screws 320, 330 into the screw opening 319.

Moreover, as illustrated, in some examples, the IM nail 310 may include one or more bone screw openings 318 in addition to, or alternatively from, the superiorly positioned screw opening 318A. For example, the body 312 of the IM nail 310 may include first and second screw openings 318B, 318C positioned inferiorly of the screw opening 319 for receiving the lag and compression screws 320, 330, although this is but one configuration and any number of different number and/or configurations of screw openings may be used. Thus, in use, one or more bone screws 350 can be inserted into one or both of the first and second screw openings 318B, 318C to secure the position of the IM nail 310 within the patient's intramedullary canal prior to fracture compression (e.g., rotation of the compression screw 350 relative to the lag screw 320). Incorporation and/or use of the screw openings 318B, 318C may be in addition to or separately from screw opening 318A. Thus, for the sake of clarity, it is envisioned that the body 312 of the IM nail 310 many include a single screw opening 318 such as, for example, 318A for receiving a trochanter screw. Alternatively, the body 312 of the IM nail 310 may include a single screw opening 318 such as, for example, screw opening 318B for receiving a distal out-of-plane interlock screw, or screw opening 318C for receiving a bone screw in the distal end of the IM nail. Alternatively, the body 312 of the IM nail 310 may include a plurality of screw openings 318 including, for example, screw openings 318A, 318B, 318C.

As illustrated, the first proximal hole 318A may be positioned anywhere between the screw opening 319 for receiving the lag and compression screws 320, 330 and the proximal or superior end 311 of the IM nail 310. In one example, the first proximal hole 318A may be positioned approximately 14 mm from the proximal or superior end 311 of the IM nail 310. The screw opening 319 may be positioned between 33 and 42 mm from the proximal or superior end 311 of the IM nail 310. The screw opening 318B may be positioned between the screw opening 319 and a distance of approximately 80 mm from the proximal or superior end 311 of the IM nail 310. The screw opening 318C may be positioned a distance between 90 and 120 mm from screw openings 319.

In addition, and/or alternatively, in some examples, the body 312 of the IM nail 310 may include one or more anterior-posterior screw openings 315 such as, for example, first and second anterior-posterior screw openings for receiving one or more bone screws 350 (e.g., anterior-posterior bone screws). In use, the anterior-posterior bone screw openings 315 can be used in combination with the screw openings 318 or alternatively therefrom.

Figure 7A:
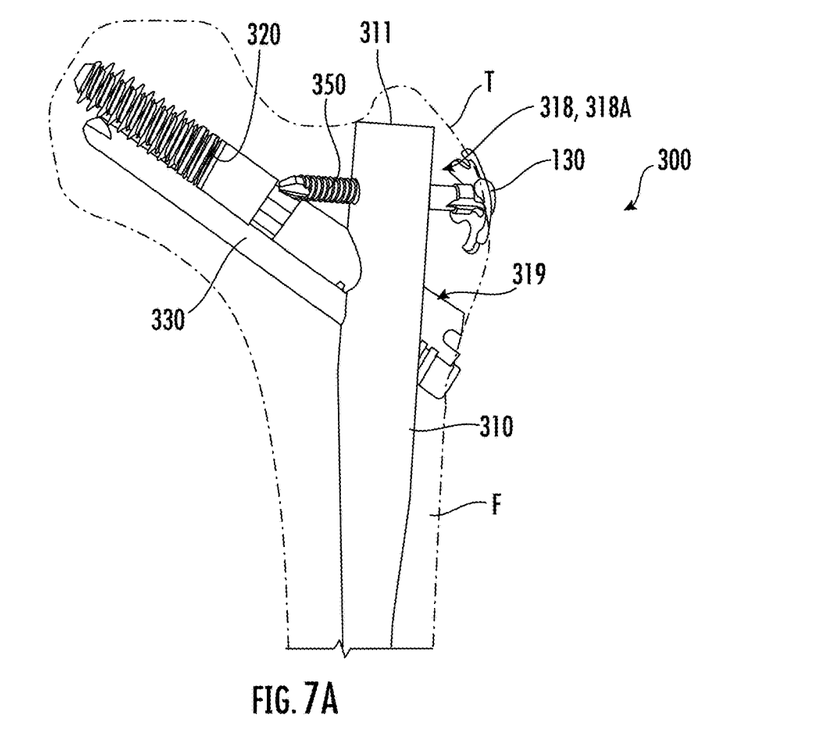
FIG. 7A is an anterior view of an alternate example of an IM nail system to treat hip fractures in accordance with one or more features of the present disclosure, the IM nail system including an IM nail utilizing nested lag and compression screws, the IM nail including one or more optional screw openings arranged to receive an external bone screw.
Figure 7B:
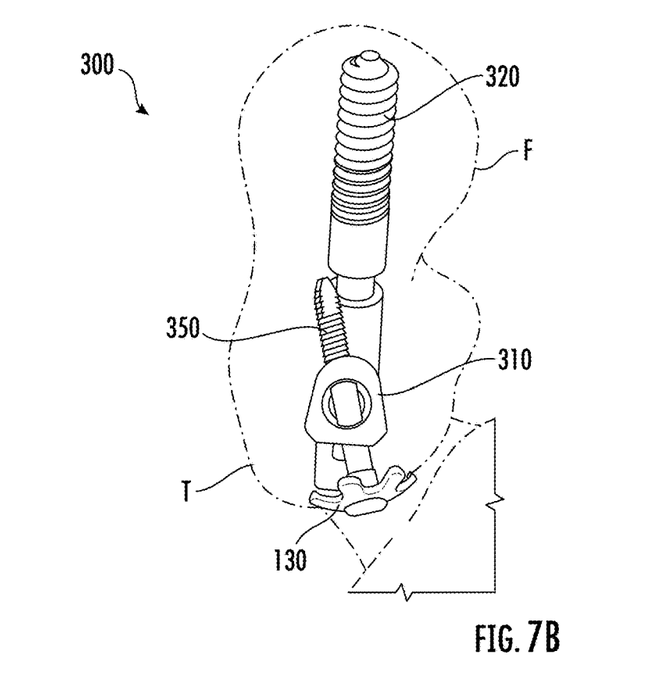
FIG. 7B is a superior or top view of the IM nail system shown in FIG. 7A.

With reference to FIGS. 7A and 7B, in use, securement of the washer 130 can be used to secure the position of bone fragments in the patient's greater trochanter T, as previously described, as well as to secure the position of the IM nail 310 within the patient's intramedullary canal. That is, by coupling the washer 130 to the IM nail 310 via bone screw 350 prior to fracture compression, the position of the IM nail 310 can be fixed within the patient's intramedullary canal. Thereafter, fracture compression can be performed but since the bone screw 350 and washer 130 are secured prior to fracture compression, the position of the IM nail 310 is fixed within the patient's intramedullary canal.

In use, the screw openings 318, 319 can be any suitable screw opening configured to engage a bone screw. For example, the screw openings can be threaded. Alternatively, the screw openings can include a plurality of fins for engaging the bone screw. For example, the screw openings may include one or more fins or ridges as described in International Application Number PCT/US2023/022229, published as WO20230224905, filed on May 15, 2023, entitled "Intramedullary Tibial Nail with Variable Angle Screw Openings," the entire disclosure of which is explicitly incorporated herein.

For example, with reference to FIGS. 6A and 6B, the distal screw opening 318C may be configured as an elongated slot. In use, the slot may include a locking ridge for engaging the threads on the bone screw. Thus arranged, the elongated slot with locking ridge prevents medial-lateral motion of the inserted bone screw while still allowing proximal/distal motion. If the bone screw is inserted into the elongated slot prior to insertion of the lag and compression screws, the IM nail will also be fixed medial-laterally within the intramedullary canal of the patient's femoral bone.

Alternatively, and/or in addition, for example, the superiorly positioned screw opening 318A may be threaded for receiving an externally threaded trochanter screw 350. Thus arranged, the bone screw 350 is locked relative to the IM nail 310. Thus arranged, compression is allowed to be drawn on a troch fracture, while the position of the IM nail 310 in the patient's greater trochanter is fixed. In use, the IM nail 310 can be positioned and the lag and compression screws 320, 330 inserted. Prior to compression, a screw 350 can be inserted through the troch hole (e.g., bone screw opening 318A) to fix the position of the IM nail 310 within the intramedullary canal of the patient's femoral bone thus preventing movement (e.g., medialization) of the IM nail 310 during fracture compression (e.g., rotation of the compression screw 330 relative to the lag screw 320). The bone screw 350 can be used with (FIGS. 7A and 7B) or without a washer 130 (FIGS. 6A and 6B). In use, a washer 130 may be used when the patient's trochanteric bone is too weak to provide a stable fixation surface.

Alternatively, in some examples, if a surgeon desires to not utilize a bone screw, a drill can be inserted through one or more of the screw openings 318 such as, for example, superiorly positioned screw opening 318A, the drill can be used to prevent medialization only intra-operatively.

The foregoing description has broad application. Accordingly, the discussion of any example is meant only to be explanatory and is not intended to suggest that the scope of the disclosure, including the claims, is limited to these example examples. In other words, while illustrative examples of the disclosure have been described in detail herein, it is to be understood that the inventive concepts may be otherwise variously embodied and employed, and that the appended claims are intended to be construed to include such variations, except as limited by the prior art.

The term "a" or "an" entity, as used herein, refers to one or more of that entity. As such, the terms "a" (or "an"), "one or more" and "at least one" can be used interchangeably herein. The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein. The phrases "at least one", "one or more", and "and/or", as used herein, are open-ended expressions that are both conjunctive and disjunctive in operation.

All directional references (e.g., proximal, distal, upper, underside, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority but are used to distinguish one feature from another. The drawings are for purposes of illustration only and the dimensions, positions, order and relative sizes reflected in the drawings attached hereto may vary.

What is claimed is:

1. A surgical method for implanting an intramedullary ("IM") nail within an intramedullary canal of a patient's bone, the method comprising:
   inserting the IM nail within the intramedullary canal, the IM nail including a body and first and second openings;
   inserting a lag screw and a compression screw into the first opening;
   after inserting the lag screw and compression screw into the first opening, inserting a bone screw into the second opening; and
   with the bone screw inserted into the second opening, rotating the compression screw relative to the lag screw to compress a fracture;
   wherein inserting the bone screw into the second opening prevents movement of the body during fracture compression.

2. The method of claim 1, wherein rotating the compression screw relative to the lag screw causes the lag screw to move laterally relative to the body.

3. The method of claim 1, wherein the second opening is located superiorly of the first opening so that the second opening is located adjacent a proximal end of the body.

4. The method of claim 1, wherein the second opening is located inferiorly of the first opening so that the second opening is located closer to a distal end of the body as compared to the first opening.

5. The method of claim 4, wherein the second opening is located adjacent to the first opening.

6. The method of claim 4, wherein the second opening is located adjacent to a distal end of the body.

7. The method of claim 1, further comprising one or more additional openings arranged and configured to receive a bone screw.

8. The method of claim 7, wherein the second opening is located superiorly of the first opening so that the second opening is located adjacent a proximal end of the body; and
   the one or more additional openings are located inferiorly of the first opening so that the one or more additional openings are located closer to a distal end of the body as compared to the first opening.

9. The method of claim 1, further comprising a washer, the method further comprising:
   positioning the washer adjacent a boney surface; and
   inserting the bone screw through an opening formed in the washer and into the second opening formed in the body.

10. The method of claim 9, wherein the second opening is located superiorly of the first opening so that the second opening is located adjacent a proximal end of the body; and
    the washer is positioned against the patient's greater trochanter.

11. A surgical method for implanting an intramedullary ("IM") nail within an intramedullary canal of a patient's bone, the method comprising:
    determining a type of fracture in the patient's bone to be repaired;
    inserting the IM nail within the intramedullary canal, the IM nail including a body and first and second openings;
    inserting a lag screw and a compression screw into the first opening;
    inserting a bone screw into the second opening after the lag screw and the compression screw have been inserted into the first opening; and
    with the bone screw inserted into the second opening, rotating the compression screw relative to the lag screw to compress the fracture;
    wherein inserting the bone screw into the second opening prevents movement of the body during fracture compression.

12. The method of claim 11, wherein the type of fractures include one of an undisplaced fracture, a simple intertroch fracture, a complex fracture, a fracture with subtroch components, or a combination thereof.

13. The method of claim 12, wherein the type of fracture is a complex fracture or a fracture with subtroch components.

14. The method of claim 11, wherein the second opening is located superiorly of the first opening so that the second opening is located adjacent a proximal end of the body.

* * * * *